United States Patent
He

(10) Patent No.: US 8,348,792 B2
(45) Date of Patent: Jan. 8, 2013

(54) TRACTION MECHANISM DRIVE

(75) Inventor: Simon Xunnan He, Troy, MI (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 146 days.

(21) Appl. No.: 12/599,724

(22) PCT Filed: Mar. 31, 2008

(86) PCT No.: PCT/EP2008/053841
§ 371 (c)(1),
(2), (4) Date: Oct. 18, 2010

(87) PCT Pub. No.: WO2008/138674
PCT Pub. Date: Nov. 20, 2008

(65) Prior Publication Data
US 2011/0039647 A1      Feb. 17, 2011

Related U.S. Application Data

(60) Provisional application No. 60/917,335, filed on May 11, 2007.

(51) Int. Cl.
*F16H 7/08* (2006.01)
*F16H 7/18* (2006.01)

(52) U.S. Cl. ........................................... 474/111
(58) Field of Classification Search ............... 474/101, 474/109, 111, 115, 117
See application file for complete search history.

(56) References Cited

U.S. PATENT DOCUMENTS

| | | | | |
|---|---|---|---|---|
| 4,832,664 A | * | 5/1989 | Groger et al. | 474/111 |
| 5,797,818 A | * | 8/1998 | Young | 474/111 |
| 6,572,502 B1 | * | 6/2003 | Young et al. | 474/111 |
| 6,641,496 B2 | * | 11/2003 | Tada | 474/111 |
| 7,063,635 B2 | | 6/2006 | Garcia | |
| 7,204,773 B2 | * | 4/2007 | Ullein | 474/111 |
| 7,241,240 B2 | * | 7/2007 | Cholewczynski | 474/111 |
| 7,329,196 B2 | * | 2/2008 | Konno et al. | 474/111 |
| 2005/0239590 A1 | * | 10/2005 | Foster | 474/140 |

FOREIGN PATENT DOCUMENTS

| | | |
|---|---|---|
| DE | 4327314 | 2/1994 |
| DE | 19856705 | 6/2000 |
| DE | 10203941 | 8/2002 |
| DE | 102004013207 | 10/2005 |
| DE | 102005036206 | 2/2007 |
| EP | 0055166 | 7/1984 |
| EP | 0193802 | 9/1986 |

* cited by examiner

*Primary Examiner* — Michael Mansen
*Assistant Examiner* — Mark K Buse
(74) *Attorney, Agent, or Firm* — Volpe and Koenig, P.C.

(57) ABSTRACT

A traction mechanism drive (1), such as a control drive of an internal combustion engine, having an endless traction mechanism, such as a link chain, connecting a drive gear (2) and at least one driven gear (3) in a form-fitting manner, at least one clamping device (5) actuated by a pressure medium and a guiding rail (6) being arranged on the periphery of the traction mechanism. At least the guiding rail (6) includes a carrier body (7) and a resiliently flexible sliding body (8) connected to the carrier body (7) on the traction mechanism side. A spring element (18) is arranged in a free space (16) between the upper side (14) of the carrier body (7) and a lower side (15) of the sliding body (8). In order to improve the damping of the traction mechanism, the spring element (18) includes at least one flexible spring (19) connected integrally to the carrier body (7) and the sliding body (8).

9 Claims, 3 Drawing Sheets

TRACTION MECHANISM DRIVE

BACKGROUND

The invention relates to a traction mechanism drive, for example, a control drive of an internal combustion engine, with an endless traction mechanism, for example, a link chain, connecting a driving gear and at least one driven gear with a positive fit, wherein at least one tensioning device actuated by a pressure medium and one guide rail are arranged on the periphery of this traction mechanism, wherein at least the guide rail has a carrier body and a resiliently flexible sliding body connected to the carrier body on the side of the traction mechanism, and wherein a spring element is arranged in a free space between the upper side of the carrier body and a lower side of the sliding body.

Such traction mechanism drives are used, for example, for timing and/or auxiliary assembly drives in internal combustion engines. The traction mechanism, for example, a link chain, is here driven by a driving gear mounted on a crankshaft of the engine and the traction mechanism itself drives driven gears that are connected to timing shafts or camshafts of the engine. For reducing transverse vibrations of the traction mechanism, it is guided by a guide on its tensioned side that extends to the driving gear, the so-called loaded belt section, and loaded by a tensioning device with a force tensioning the link chain on the slack side that runs out from the driving gear, the so-called slack belt section.

Traction mechanism drives typically span relatively large distances between the crankshaft and the one or more camshafts. In order to prevent vibrations of the link chain in the driving plane, the link chain is guided on at least one guide rail in the regions between the mentioned shafts. For this purpose, a chain tensioner transmits its force via a moving tensioning rail to the link chain. In contrast, the guide rail arranged in the region of the loaded belt section is connected fixed in position with the engine. Here, the link chain slides over the guide rail that is usually made from an elongated carrier body arranged laterally parallel to the loaded belt section and mounted fixed on the housing, wherein this carrier body is made from a light-metal alloy or a fiber-reinforced plastic material, and from a sliding body mounted on the carrier body on the side of the traction mechanism, wherein this sliding body is made from a low-friction and wear-resistant plastic. The guide rail is used essentially for suppressing radial impact and oscillation movements of the traction mechanism and thus for avoiding large dynamic loads and a great generation of noise by the traction mechanism drive.

Nevertheless, previously it had not always been avoided that especially in the case of material-fatigued traction mechanisms in the form of link chains, relatively high dynamic forces in the form of vibrations and oscillating impact movements act on the guide rail that cannot be damped under all conditions, so that, despite the presence of springs and other damping elements in the guide rail or in the chain tensioner, vibrations are generated that negatively affect the service life of the traction mechanism drive.

From DE 198 56 705 A1, a guide device for a link chain of a chain drive is known in which guide elements are continued as an elastic mass element past their guiding length, without the chain continuously contacting the guide elements in their continued region. In the case of an embodiment according to FIG. 2 in that document, two ends of the guide element are formed as inherently elastic projections that are used for damping chain vibrations. Spring elements for damping are not provided in this reference.

From EP 0 055 166 B1, a mechanical tensioning device for drive chains is known that comprises a ramp that is formed by at least one curved spring leaf having a sliding surface and that is set elastically against the chain and that is also provided with anti-reverse-motion means for preventing recoil of the ramp. The spring leaf, consisting of spring steel, is fixed at its ends on a metallic carrier that is fixed rigidly on a housing part of an internal combustion engine.

From US 2005/0239590 A1, a guide rail of a traction mechanism drive is known in which the guide rail is made from a convex shaped steel bar that is fixed rigidly with its ends on a housing part of an internal combustion engine. A sliding body made from flexible material is injection molded around the steel bar. By influencing the stiffness of the sliding body, vibrations of the link chain are to be damped.

From DE 43 27 314 A1, a chain tensioner is known with a leaf spring and a flange for exerting a tension on a chain, wherein the flange is made from a plastic that undergoes a creep deformation when it is exposed to a force at elevated temperatures, and wherein the flange has a pocket receiving the leaf spring between a first end and a second end that is closed at the first flange end and the second flange end and also along a first side of the flange and that is open along a second side of the flange for holding the leaf spring. In this way, the leaf spring is fixed mechanically so that it exerts a force on the flange, without any attachment means or recesses that could lead to concentrated-stress points having to be provided in the leaf spring. Furthermore, because the leaf spring is encapsulated in the pocket by three sides of the flange, the leaf spring is protected from contact with any clips or carriers to which the chain tensioner could be attached. This construction should contribute to increased strength of the flange, because the complete cross section of the flange receives the force of the spring at both ends. The result is a stronger flange that is less easily damaged during operation.

From U.S. Pat. No. 7,063,635 B2, a guide rail of a traction mechanism drive is known in which a leaf spring made from spring steel in pockets of an integral guide rail is placed parallel to the contact surface of the guide rail. The leaf spring should absorb at least a portion of the forces of the link chain acting on the guide rail.

Finally, from DE 10 2005 036 206 A1, a traction mechanism drive according to the class is known in which it is provided that the guide rail is constructed to be actuated at least partially normal to the traction mechanism, is loaded by at least one spring element in the direction toward the traction mechanism with an adjusting force, and is provided at least with one outer stop for limiting a control movement away from the traction mechanism. According to FIG. 4 in that document, a spring element is arranged between the sliding coating body and the carrier body. Here, movement of the sliding coating body is realized relative to the carrier body and normal to the traction mechanism, wherein this movement is limited in the direction toward the traction mechanism essentially by a release of tension in the spring element and in the opposite direction by the inside of the carrier body or the clamping of the spring element. Here, the body has a resiliently flexible construction, is connected rigidly to the carrier body in the region of one longitudinal-side end, and is held in the region of the opposite longitudinal-side end so that it can move tangentially on the carrier body. In this way, the sliding coating body is, on one hand, fixed reliably on the carrier body and, on the other hand, can adapt optimally to the appropriate adjustment path relative to the carrier body.

Also, the guide rail described in DE 10 2005 036 206 A1 has proven to have a complicated overall setup, because carrier bodies, sliding bodies, and the spring element are separate parts and are made from different materials. The damping potential also offers room for improvement.

SUMMARY

The invention is based on the objective of providing a traction mechanism drive that eliminates the mentioned disadvantages. In particular, a traction mechanism drive should be provided that has improved force damping of the traction mechanism acting on the tensioning and guide elements and that is also simple and economical to produce.

The invention is based on the knowledge that the stated objective can be solved in a surprisingly simple way in that at least the guide rail is constructed as an integral component in which at least one spring element is inserted integrally between its sliding body and its carrier body and is connected integrally to the carrier body and to the sliding body.

The invention starts from a traction mechanism drive, for example, a timing drive of an internal combustion engine, with an endless traction mechanism, for example, a link chain, connecting a driving gear and at least one driven gear with a positive fit, wherein at least one tensioning device actuated by pressure medium and one guide rail are arranged on the periphery of this traction mechanism, wherein at least the guide rail has a carrier body and a resiliently flexible sliding body connected to the carrier body on the traction mechanism, and wherein one spring element is arranged in a free space between the upper side of the carrier body and a lower side of the sliding body. In addition, it is provided that the spring element is at least one flexible spring connected integrally to the carrier body and to the sliding body.

Through this configuration, it is achieved advantageously that at least the guide rail is constructed as an integral component to be produced economically, wherein the spring element integrated as one component in the guide rail can absorb or damp forces occurring in the link chain in a particularly effective way.

In addition, it can be provided that the tensioning device actuated by pressure medium is also a chain tensioner that has a carrier body and a resiliently flexible sliding body connected to the carrier body on the side of the traction mechanism, wherein a spring element is arranged in a free space between the upper side of the carrier body and a lower side of the sliding body, and wherein the spring element is a flexible spring connected integrally to the carrier body and to the sliding body. In this case, not only the guide rail, but also the chain tensioner can be constructed integrally and with an integrated spring element, so that the chain tensioner also takes part in the damping of vibrations, oscillations, and oscillating movements that occur in the link chain.

In other practical refinements it can be provided that the spring element is made from a plurality of flexible springs that are each constructed as leg springs, bow springs, or leaf springs that are formed integrally on the carrier body and on the sliding body. This construction can also be expanded so that the number of flexible springs preferably equals between two and twenty.

Another construction of the invention provides that the carrier body is connected integrally with the sliding body, wherein the sliding body is injection molded or cast on longitudinal-side ends of the carrier body. Likewise, it lies in the scope of the invention to provide that the free space has the shape of a slot or an elongated hole.

In one especially practical refinement of the invention, it is provided that the carrier body has a plurality of ribs arranged like a lattice relative to each other and between which remain hollow spaces that are formed as continuous holes or as pot-shaped recesses. Alternatively, it could be provided that the carrier body has a solid construction.

Especially advantageous is also a construction of the invention that distinguishes itself in that the carrier body can be fixed rigidly on a housing part of the internal combustion engine by two attachment boreholes and two attachment bolts.

Another advantageous construction of the invention provides that the guide rail is a plastic, injection-molded part made from polypropylene, polyamide, or a polycarbonate. Finally, especially advantageous is a construction of the invention that distinguishes itself in that the chain tensioner is also a plastic injection-molded part made from polypropylene, polyamide, or a polycarbonate.

BRIEF DESCRIPTION OF THE DRAWINGS

The invention will be explained in greater detail below with reference to the enclosed drawing. Shown therein are.

DETAILED DESCRIPTION OF THE PREFERRED EMBODIMENTS

Figure 1:
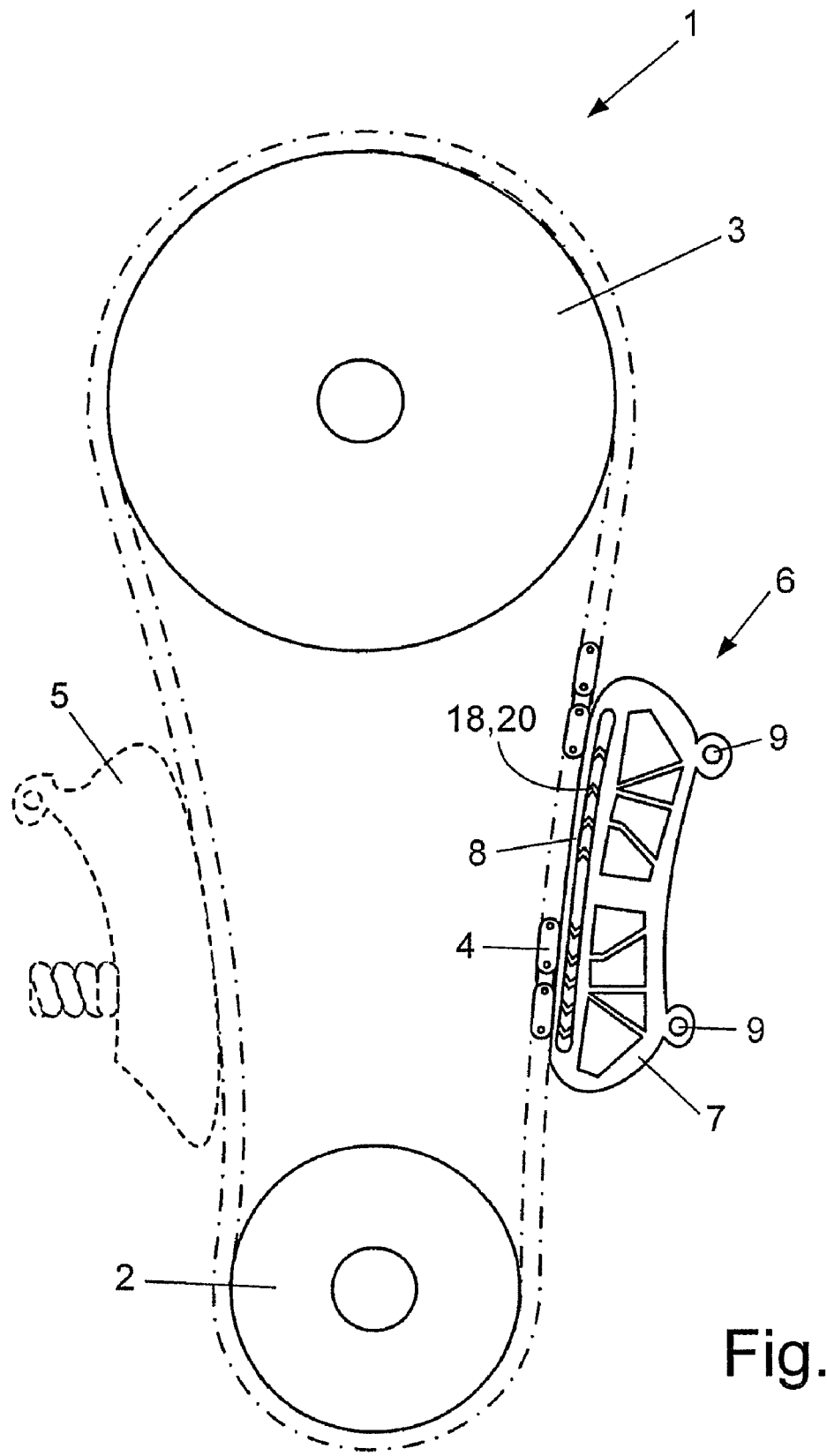
FIG. 1 a schematic diagram of a first embodiment of a traction mechanism drive according to the invention, FIG. 2 a side view of a guide rail from FIG. 1 in a larger diagram, FIG. 3 a side view of a guide rail of a second embodiment of a traction mechanism drive according to the invention, FIG. 4 a side view of a guide rail of a third embodiment of a traction mechanism drive according to the invention, and FIG. 5 a diagram of forces due to contraction acting on a traction mechanism drive according to the invention and on a conventional traction mechanism drive.

Accordingly, in FIG. 1 a first embodiment of a traction mechanism drive 1 according to the invention is shown schematically. The traction mechanism drive 1 is used as a timing drive for an internal combustion engine, not shown in more detail, and has an endless traction mechanism in the form of a link chain 4 connecting a driving gear 2 and also a driven gear 3 with a positive engagement. Tensioning mechanisms in the form of a chain tensioner 5 actuated by a pressure medium and only indicated schematically are arranged on the side of the slack belt section and tension the link chain 4 by an indicated spring or an actuator operated by pressure medium.

In the region of the loaded belt section, that is, in the region in which the link chain 4 is in tension, there is a guide rail 6 with a carrier body 7 and a resiliently flexible sliding body 8 fixed on the carrier body 7 on the side of the traction mechanism. The carrier body 7 is fixed rigidly on a not-shown housing part of the internal combustion engine by two cylindrical attachment boreholes 9 and two not-shown housing-fixed attachment bolts.

Figure 2:
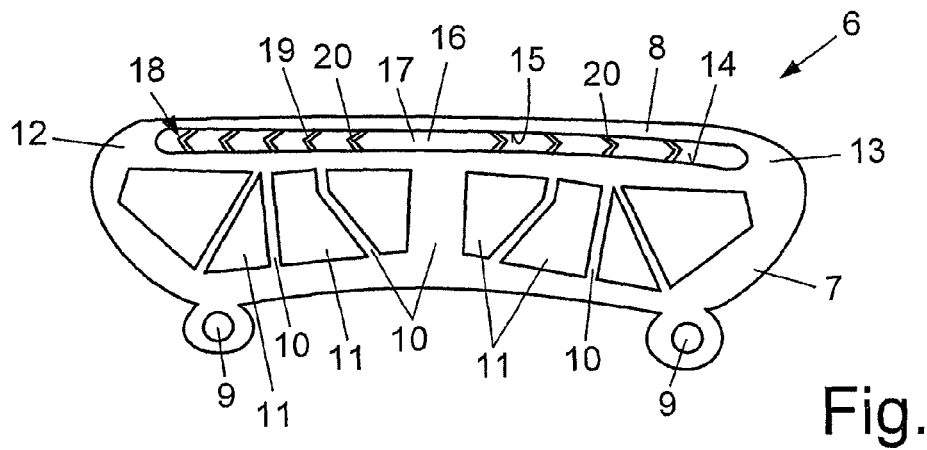

In FIG. 2, the guide rail 6 from FIG. 1 is shown in a larger view relative to FIG. 1. The carrier body 7 has a series of ribs 10 that are arranged like a lattice relative to each other and that are used for reinforcing the carrier body 7. Hollow spaces 11 that could be formed as continuous holes or as pot-shaped recesses remain between the ribs 10. This construction is used for saving weight and material. The carrier body 7 is connected integrally to the sliding body 8 in that this is injection molded or cast on longitudinal-side ends 12 and 13 of the carrier body 7 and such that a free space 16 in the form of a slot 17 remains between an upper side 14 of the carrier body 7 and between a lower side 15 of the sliding body 8.

In the free space 16 there is a spring element 18 that connects the carrier body 7 and the sliding body 8 to each other in a spring-elastic manner. The spring element 18 is made from a plurality of elastic springs 19 that are formed as leg springs 20 in the embodiment according to FIGS. 1 and 2. The leg springs 20 are formed integrally on the carrier body 7 and on the sliding body 8.

In the case of an unloaded link chain 4, the sliding body 8 is pressed away from the upper side 14 of the carrier body 7 in the direction toward the link chain 4 to a maximum degree by the leg springs 20 for releasing tension. In contrast, in the case of a loaded chain link 4, the sliding body 8 is pressed against the restoring force of the leg springs 20 in the direction toward the upper side 14 of the carrier body 7. In this way, the guidance of the chain link 4 by the guide rail 6 is not rigid, but is instead flexible to a certain, definable degree, so that oscillations, vibrations, and oscillating movements of the link chain 4 can be damped in the region of the guide rail 6, so that, overall, a quieter and lower-wear guidance of the link chain 4 is produced.

Here, the guide rail 6 has a comparatively simple construction and can be produced as an integral plastic component by conventional injection molds in an injection-molding process, so that it manages without separate parts that are complicated to assemble. Likewise, through the construction of the spring element 18 according to the invention, flexible metallic springs can be eliminated.

Figure 3:
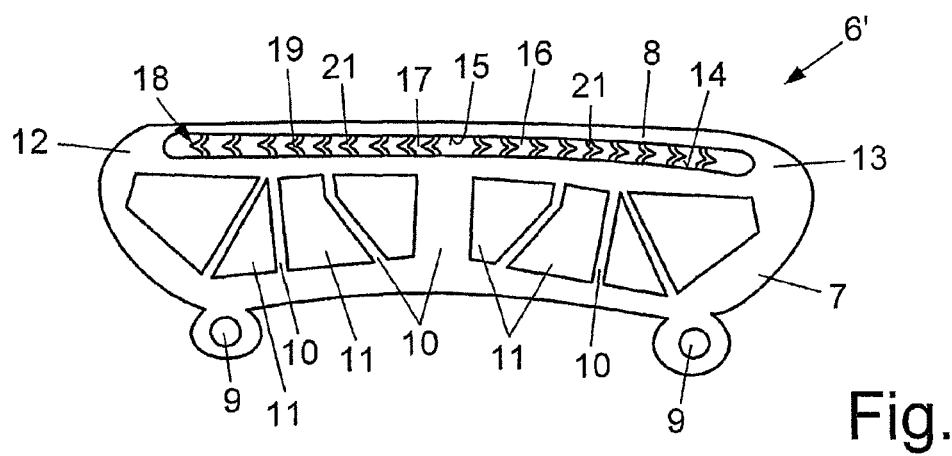

In FIG. 3, a second embodiment of a guide rail 6' is shown that largely corresponds to the guide rail 6 shown in FIGS. 1 and 2 and that uses the same reference symbols for the same parts. In the free space 16, a spring element 18 is also arranged that connects the carrier body 7 and the sliding body 8 to each other in a spring-elastic way. The spring element 18 also is formed of a plurality of flexible springs 19 that are constructed as bow springs 21 in the case of the embodiment according to FIG. 3. The bow springs 21 are also formed integrally on the carrier body 7 and on the sliding body 8 and connect the two bodies in a spring-elastic way as described above.

Figure 4:
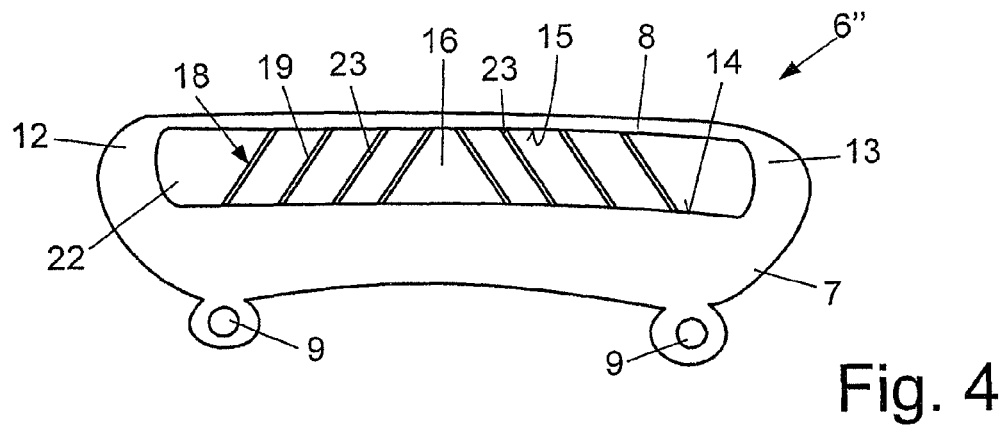

In FIG. 4, a third embodiment of a guide rail 6" is shown that largely corresponds to the guide rail 6 or 6' shown in FIGS. 1 to 3 and uses the same reference symbols for the same parts. The carrier body 7 is here constructed as a solid part without ribs and hollow spaces underneath the upper side 14, but can also have, deviating from the illustrated embodiment, ribs and hollow spaces in the way described above.

In this embodiment, the free space 16 is constructed not as a slot but instead as an elongated hole 22, so that the distance between the upper side 14 of the carrier body 7 and the lower side 15 of the sliding body 8 is greater than in the embodiments described above. In the free space 16 there is also a spring element 18 that connects the carrier body 7 and the sliding body 8 to each other in a spring-elastic manner. The spring element 18 also consists of a plurality of flexible springs 19 that are each formed as straight leaf springs 23 in the case of the embodiment according to FIG. 4. The leaf springs 23 are formed integrally on the carrier body 7 and on the sliding body 8, such that the ends of the leaf springs 23 connected to the upper side 14 of the carrier body 7 or to the lower side 15 of the sliding body are set at an angle deviating from 90°.

Figure 5:
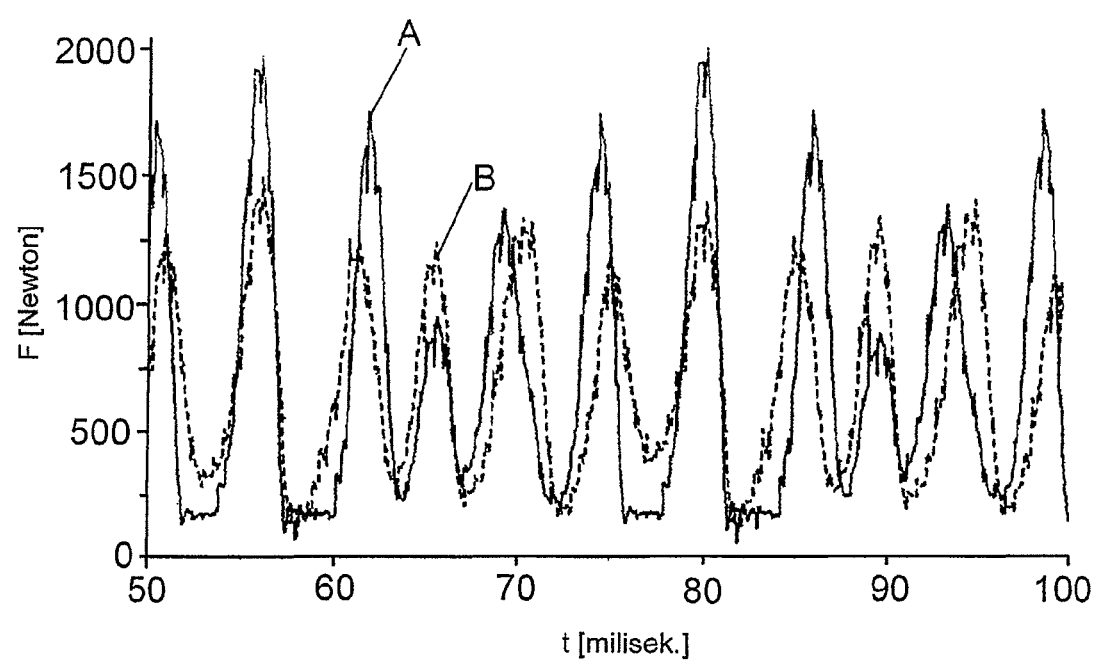

FIG. 5 shows a diagram with the time profiles of a force exerted by a link chain on a conventional guide rail and on a guide rail 6 according to the invention measured at the bearing points 9 of each guide rail. On the Y-axis of the diagram, the force is recorded in Newtons, while the X-axis gives the time in milliseconds. The solid line A shows the force profile for a link chain acting on a conventional guide rail, while the dashed line B shows the force profile of a link chain acting on a guide rail 6 according to the invention. It is to be recognized, in particular, that the force peaks in a guide rail 6 according to the invention are much lower than in a non-damped guide rail according to the state of the art.

The guide rails 6, 6', 6" constructed according to the invention can be produced economically and easily, especially in that they can be made as a plastic injection-molded part made from a suitable material, such as polypropylene, polyamide, or a polycarbonate. In addition, the guide rails 6, 6', 6" withstand the high forces produced during the operation of a traction mechanism drive. For reducing the appearance of wear, the contact surface of the sliding body 8 directed toward the link chain 4 can be provided with a coating or sleeve reducing the wear. According to the purpose, the number of flexible springs 19 can vary, wherein flexible springs 19 in numbers from two to twenty have proven to be advantageous.

It lies in the scope of the invention to also form the chain tensioner 5 only indicated in FIG. 1 according to the guide rail 6, that is, to construct, in a similarly comparable way, the guide rails 6, 6', 6" according to FIGS. 1 to 4 such that the chain tensioner 5 has a carrier body and a resiliently flexible sliding body connected to the carrier body on the traction mechanism side, wherein a spring element is arranged in a free space between the upper side of the carrier body and a lower side of the sliding body. This spring element would then similarly be a flexible spring connected integrally to the carrier body and to the sliding body, wherein this spring could be constructed as a plurality of leg springs, bow springs, or leaf springs.

LIST OF REFERENCE SYMBOLS

| | |
|---|---|
| 1 | Traction mechanism drive |
| 2 | Driving gear |
| 3 | Driven gear |
| 4 | Chain link |
| 5 | Chain tensioner, tensioning device |
| 6 | Guide rail |
| 7 | Carrier body |
| 8 | Sliding body |
| 9 | Attachment borehole |
| 10 | Rib |
| 11 | Hollow space |
| 12 | Longitudinal-side end of the carrier body 7 |
| 13 | Longitudinal-side end of the carrier body 7 |
| 14 | Upper side of the carrier body 7 |
| 15 | Lower side of the sliding body 8 |
| 16 | Free space |
| 17 | Slot |
| 18 | Spring element |
| 19 | Flexible spring |
| 20 | Leg spring |
| 21 | Bow spring |
| 22 | Elongated hole |
| 23 | Leaf spring |
| A | Force profile versus time |
| B | Force profile versus time |

The invention claimed is:

1. Traction mechanism drive of an internal combustion engine, comprising an endless traction mechanism connecting a driving gear and at least one driven gear, at least one tensioning device actuated by pressure medium and at least one guide rail are arranged on a periphery of the traction mechanism, the at least one guide rail has a carrier body and a resiliently flexible sliding body connected to the carrier body on a traction mechanism side, and a spring element is arranged in a free space defined as a slot located between longitudinal side-ends of the carrier body, an upper side of the carrier body and a lower side of the sliding body, the spring element comprises at least one flexible spring connected integrally to the upper side of the carrier body and to the lower side of the sliding body, and the carrier body has two attachment screw holes or boreholes through which attachment bolts or screws can be guided.

2. Traction mechanism drive according to claim 1, wherein the spring element comprises a plurality of flexible springs that are each formed as leg springs, bow springs, or leaf springs that are each formed integrally on the carrier body and on the sliding body.

3. Traction mechanism drive according to claim 2, wherein a number of the flexible springs equals between two and twenty.

4. Traction mechanism drive according to claim 1, wherein the carrier body is connected integrally to the sliding body, wherein the sliding body is injection molded or cast on the longitudinal-side ends of the carrier body.

5. Traction mechanism drive at least according to claim 1, wherein the carrier body has a plurality of ribs that are arranged in a lattice shape relative to each other and between which remain hollow spaces that are formed as continuous holes or as pot-shaped recesses.

6. Traction mechanism drive at least according to claim 1, wherein the carrier body has a solid construction.

7. Traction mechanism drive at least according to claim 1, wherein the guide rail is a plastic injection-molded component made from polypropylene, polyamide, or a polycarbonate.

8. Traction mechanism drive according to claim 1, wherein the chain tensioner is a plastic injection-molded component made from polypropylene, polyamide, or a polycarbonate.

9. Traction mechanism drive account to claim 1, wherein the traction mechanism drive is a timing drive, and the endless traction mechanism comprises a link chain.

* * * * *